Patented Sept. 12, 1933

1,926,813

UNITED STATES PATENT OFFICE 1,926,813

PROCESS OF CLARIFYING USED DRY CLEANING FLUIDS

Ralph A. Morgen, Kansas City, Mo.

No Drawing. Original application July 28, 1930, Serial No. 471,436. Divided and this application July 11, 1931. Serial No. 550,281

3 Claims. (Cl. 196—15)

This invention relates to processes of purifying used dry cleaning fluid and has for its principal objects to speed up the operation of clarifying a stream of dry cleaning solvent and to effect the removal of soaps, fatty acids, and the like from used solvent without hazard of rendering the solvent injurious to clothes.

Particular objects of the invention are to effect regeneration of adsorbing material employed for removing impurities from dry cleaning fluids in a dry cleaning system, and to provide for re-using purifying materials a number of times without removal of the materials from the system, this application being a division from applicant's co-pending application Serial No. 471,436, wherein the materials used and the process employed were substantially disclosed.

I have discovered that certain natural and artificially produced silicious materials such as the natural silicate coming from the Creede formation in Colorado, and particularly a dehydrated clay, has peculiarly valuable properties of adsorbing soluble impurities and soaps present in used dry cleaning fluid, for example, vegetable and animal oils and fatty acids. Silicious materials of the character referred to are able to rapidly adsorb relatively large amounts of the impurities compared with the amounts adsorbed by ordinary clay materials, and substantially all the soaps and other soluble impurities in a body of used dry cleaning fluid may be efficiently separated from the fluid by the insoluble silicious material.

The peculiar structure of the natural silicate from the Creede formation, and like substances which may be artificially produced, confers the properties of quickly absorbing impurities, and holding amounts of impurities relatively large compared with the surfaces of particles. A sufficient amount of the material may therefore be mixed with a body of used dry cleaning fluid to adsorb all the impurities therein without unduly thickening the body of fluid or requiring excessive and impractical settling or filtering treatment, and thus completely extract impurities from the fluid. The fluid may then be separated from the material, and no accessory substances are required for reconditioning the fluid.

The efficiency of the silicious material for adsorbing impurities decreases rapidly, however, for example a second use of a body of material may remove substantially 75% of the impurities, and a third use may remove substantially half of the impurities.

Regeneration or purification of silicious material by ordinary processes, for reuse, is relatively troublesome and expensive.

I have further discovered that when a solid alkaline material is included in a mixture of fluid and silicious material, the alkali tends to effect regeneration of the material whereby a single body of mixture of silicious material and alkali may be used for a relatively large number of times for purifying used solvent without appreciable reduction of efficiency.

The alkali does not itself act upon the impurities to any appreciable extent, except that certain alkalis may absorb water moisture present as an impuritiy in a solvent, but apparently the silicious material acts analogously to a catalyst to pick up and adsorb the particles of oils and soap and render them susceptible to capture by the alkali.

The solid alkali is capable of holding substantially ten times the amount of soluble impurities such as fatty acids and the like which an equal quantity of silicious material could absorb, but requires a relatively long period to act, the slow action rendering the solid-alkali impracticable for direct and exclusive use for removing soaps and fatty acids.

While any alkali might be used to purify the silicious material, I prefer an alkali which if carried over into the washer with purified fluid will have no deleterious effect on fabrics and suggest as preferred mild alkali materials, lime, sodium silicate, tri-sodium phosphate and sodium carbonate.

The alkalis which I prefer to mix with the silicious material and liquid are soluble in water and particularly are controlled alkalis, that is to say, alkalis that when put into water will give only a limited alkalinity, such as those examples above mentioned, and which contrast with a strong alkali such as caustic soda, which is relatively troublesome, due chiefly to the damage which it might cause to clothes if carried over to a washer.

In one aspect therefore, the invention consists in employing a dehydrated clay as a purifying agent in removing soluble impurities including soap and fatty acids from used dry cleaning solvent. In a further aspect, the invention consists in employing a mixture comprising dehydrated silicious material in powdered form, and a mild alkali, for removing soluble impurities from a used dry cleaning solvent. A filter aid such as diatomaceous earth may be added to the mixture to improve the porosity of the filter cake and hence the filterability of the dirty and used chemicals, since the mixture otherwise would have only limited filter aid properties.

The process in its simplest form may be carried out in any convenient and suitable apparatus, it being sufficient that the silicious material having great adsorptive properties be mingled with the used fluid with sufficient agitation to assure contact of silicious particles with impurities dissolved in the fluid. When the second phase of the process is also used, the alkali will be mingled with silicious material carrying adsorbed matter with sufficient agitation to effect contact between alkali particles and adsorbed matter.

The silicious material and alkali may be mixed dry and introduced in a single body into a tank containing the used liquid, and the contents stirred to distribute the adsorbing material and alkali through the liquid. Five minutes will be ample to bring about the adsorption of the impurities, and the action of the alkali on the adsorbed impurities whereby the silicious material is regenerated.

The purified fluid may be separated from the silicious material by any suitable or convenient method, for example, the material and alkali being allowed to settle in a tank and the purified fluid then drawn off, or the fluid may be filtered or clarified by centrifugal treatment.

The used mixture of silicious material and alkali containing the impurities adsorbed from the first batch of fluid treated may then be used again with another batch of impure fluid, the silicious material again adsorbing impurities, and the alkali again reconditioning the adsorbing material.

The single mass of mixed adsorbing material and alkali may be reused many times, for substantially completely removing fatty acids, oil, soap, and like soluble impurities from separate batches of polluted fluid, or from a stream of fluid that is intermittently repolluted.

The reuse of the mixture of silicious material and alkali is limited by the ability of the alkali to receive the impurities adsorbed by the material, the alkali taking up, for example, ten to twenty times as much soluble impurities as the silicious material. As an example of the proportions of ingredients preferably used for removing soaps, fatty acids, and the like, I therefore suggest equal parts by weight of silicious material and alkali whereby the alkali will effect regeneration of the body of silicious material ten or twenty times as the case may be before renewal of the purifying mixture is required.

It is well known that silicious material of this sort will adsorb coloring matter from a fluid, and the proportions of adsorbing material and alkali may therefore be varied to take advantage of this property, the proportion of adsorbing material being increased to provide a sufficient excess over that required to cooperate with the alkali to adsorb coloring matter.

All or part of a continuously circulating stream of the used liquid may be carried from a washer back to the washer through a treating zone containing the adsorbing material or the mixture of the adsorbing material with alkali.

The treatment may be applied either before or after solids are removed from the stream, since the presence of solid impurities will have no appreciable influence on the efficiency of the treatment.

In the simplest arrangement the treatment is conferred on the used fluid before the same is passed through the separating process so that the separation of solid impurities from the stream of used fluid is effected coincidently with the separation of the clay and alkali from the purified fluid.

The agitation of the silicious material and alkali in the fluid may be effected by passing a stream of the fluid through a body of the material.

The process may further be carried out by by-passing a portion of a circulating stream of used fluid through a zone containing the treating material, whereby a portion of the stream may be relieved of a proportion of soluble impurities upon each incident of circulation of the stream, the fluid and treating materials being separated before return of the fluid to a washer.

The rapidity of the action of the silicious material described on the soluble impurities in the used fluid, and of the action of the alkali on adsorbed material, provide a process whereby the purified fluid may be returned to the washer more promptly than when caustic soda is employed, and when a water rinse is required to free the solvent of the caustic soda. The process further obviates the use of a water rinse, and in fact may provide for adsorption of water moisture by the alkali, thus avoiding the hazards of permitting water or caustic to enter a washer.

A substantially smaller quantity of dry cleaning fluid may therefore be employed to provide a continuously circulating stream passing through a washer and being purified while in circulation.

The purifying mixture will preferably consist chiefly of powdered silicious material and alkali, though portions of the body may consist of larger particles to promote movement of fluid through the body.

What I claim and desire to secure by Letters Patent is:

1. The process of clarifying used dry cleaning fluid including adding to the fluid an activated silicious material such as is obtained by heat treating clay from the Creede formation in Colorado capable of adsorbing acidic impurities contained in the fluid and an alkali capable of reacting with said acidic materials to remove same from the silicious material, and separating the silicious and alkaline materials and acidic impurities from the fluid.

2. The process of clarifying used dry cleaning fluid including distributing silicious material such as obtained by heat treating clay from the Creede formation in Colorado and alkaline material through the fluid to effect adsorption of impurities in the fluid on the activated silicious material and removal of the impurities from the silicious material by reaction with the alkaline material, and removal of the impurities, the silicious material and the alkaline material from the fluid.

3. The process of clarifying used dry cleaning fluid including adding to the fluid an activated silicious material having the equality of natural silicate from the Creede formation for removing impurities from solution in the fluid by adsorption by the activated silicious material, adding alkaline material, such as lime, sodium silicate, tri-sodium phosphate and sodium carbonate, capable of reacting with such adsorbed impurities to remove the impurities from adsorption by the silicious material, and removing the impurities, the silicious material and the alkaline material from the fluid by filtration.

RALPH A. MORGEN.